(12) United States Patent
Damgaard et al.

(10) Patent No.: US 12,476,468 B2
(45) Date of Patent: Nov. 18, 2025

(54) WIND TURBINE WITH INTEGRATED BATTERY STORAGE

(71) Applicant: KK Wind Solutions A/S, Ikast (DK)

(72) Inventors: Chris Damgaard, Herning (DK); Lorand Bede, Herning (DK); Anders Eggert Maarbjerg, Ulstrup (DK)

(73) Assignee: KK Wind Solutions A/S, Ikast (DK)

( * ) Notice: Subject to any disclaimer, the term of this patent is extended or adjusted under 35 U.S.C. 154(b) by 0 days.

(21) Appl. No.: 18/958,899

(22) Filed: Nov. 25, 2024

(65) Prior Publication Data

US 2025/0118969 A1    Apr. 10, 2025

Related U.S. Application Data

(63) Continuation of application No. 18/226,939, filed on Jul. 27, 2023, now Pat. No. 12,155,218, which is a
(Continued)

(30) Foreign Application Priority Data

May 25, 2018    (DK) .............................. PA201870314

(51) Int. Cl.
*H02J 3/38*    (2006.01)
*F03D 7/04*    (2006.01)
(Continued)

(52) U.S. Cl.
CPC .............. *H02J 3/381* (2013.01); *F03D 7/044* (2013.01); *F03D 9/11* (2016.05); *H02J 7/00714* (2020.01);
(Continued)

(58) Field of Classification Search
CPC ........ F03D 7/044; F03D 9/11; H02J 7/00714; H02J 2300/28; H02J 7/1415; H02J 9/061;
(Continued)

(56) References Cited

U.S. PATENT DOCUMENTS 3,539,915 A * 11/1970 Wood .................... G01N 27/904
324/220
5,642,275 A    6/1997 Peng et al.
(Continued)

FOREIGN PATENT DOCUMENTS

CN    105210258    12/2014
CN    105322772    2/2016
(Continued)

*Primary Examiner* — Pedro J Cuevas
(74) *Attorney, Agent, or Firm* — Lee & Hayes, P.C.

(57) ABSTRACT

A battery storage and/or a wind turbine including the battery storage. A generator for generation of an electric current. An electric flow path configured for conducting the electric current to an electric grid via a power converter, the power converter. The battery storage electrically connected to the electric flow path, the battery storage comprising a plurality of battery cells, each battery cell comprising at least one battery element and at least two semiconductor switches. A controller is configured for selectively controlling the voltage over the battery storage by controlling the status of the at least two semiconductor switches of a plurality of the battery cells, and thereby whether a current path through the battery storage is bypassing the at least one battery element or passing through the at least one battery element of one or more of the plurality of battery cells.

25 Claims, 7 Drawing Sheets

Figure 1:
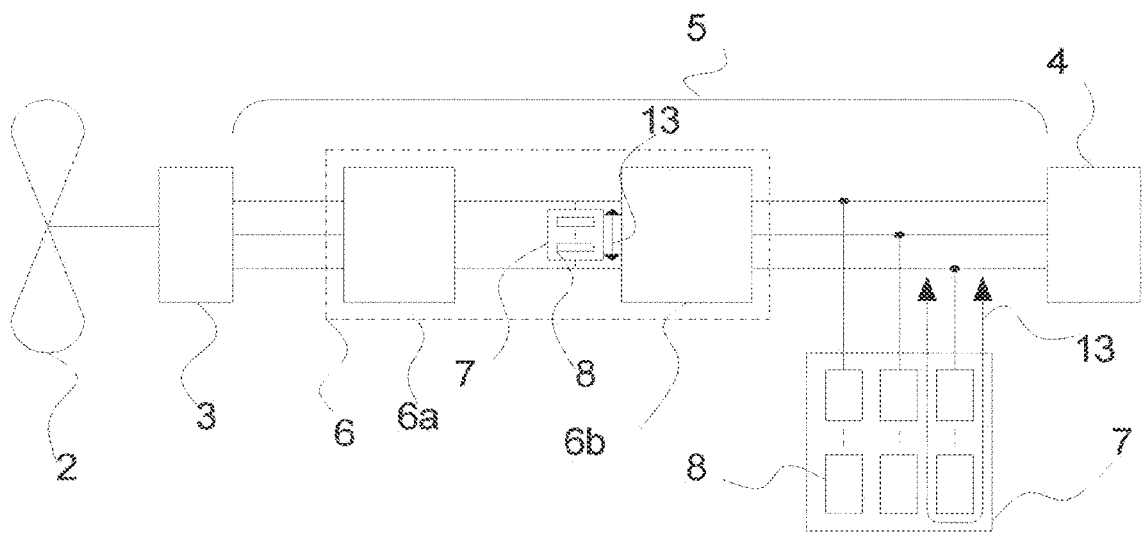

Related U.S. Application Data continuation of application No. 17/666,340, filed on Feb. 7, 2022, now Pat. No. 11,742,669, which is a continuation of application No. 17/056,184, filed as application No. PCT/DK2019/050165 on May 24, 2019, now Pat. No. 11,248,586.

(51) Int. Cl.
    *F03D 9/11*     (2016.01)
    *H02J 7/00*     (2006.01)

(52) U.S. Cl.
    CPC ... *F05B 2220/7062* (2013.01); *F05B 2260/42* (2013.01); *F05B 2260/80* (2013.01); *F05B 2270/337* (2013.01); *F05B 2270/502* (2013.01); *F05B 2270/706* (2013.01); *H02J 2300/22* (2020.01); *H02J 2300/28* (2020.01); *Y02E 10/72* (2013.01); *Y02E 70/30* (2013.01)

(58) Field of Classification Search
    CPC ..... H02J 3/32; F05B 2260/42; F05B 2260/80; F05B 2270/337; F05B 2270/502; F05B 2270/706; Y02B 10/70
See application file for complete search history.

(56) References Cited

U.S. PATENT DOCUMENTS

| | | | |
|---|---|---|---|
| 5,986,907 | A | 11/1999 | Limpaecher |
| 6,229,288 | B1 | 5/2001 | Baretich et al. |
| 6,366,062 | B2 | 4/2002 | Baretich et al. |
| 7,102,334 | B2 | 9/2006 | Wiegand et al. |
| 7,315,151 | B2 | 1/2008 | Thompson et al. |
| 7,595,613 | B2 | 9/2009 | Thompson et al. |
| 8,803,367 | B2 | 8/2014 | Sander |
| 9,035,578 | B2 | 5/2015 | Feuerstack et al. |
| 9,450,274 | B2 | 9/2016 | Vo et al. |
| 9,577,441 | B2 | 2/2017 | Fassnacht et al. |
| 9,667,232 | B2 * | 5/2017 | Kuznetsov ................ H02J 3/30 |
| 9,698,685 | B2 | 7/2017 | Calhoun et al. |
| 10,074,997 | B2 | 9/2018 | Vo et al. |
| 10,090,777 | B2 | 10/2018 | Dent |
| 10,110,122 | B2 | 10/2018 | Bari et al. |
| 10,170,990 | B2 | 1/2019 | Calhoun et al. |
| 10,305,298 | B2 | 5/2019 | Kristensen |
| 10,404,154 | B2 | 9/2019 | Yoscovich et al. |
| 10,536,104 | B2 | 1/2020 | Bando et al. |
| 10,637,342 | B2 | 4/2020 | Chen et al. |
| 10,784,808 | B2 | 9/2020 | Bando et al. |
| 11,248,586 | B2 | 2/2022 | Damgaard et al. |
| 11,742,669 | B2 | 8/2023 | Damgaard et al. |
| 11,955,607 | B2 * | 4/2024 | Maarbjerg ........... G01R 31/392 |
| 12,126,216 | B2 * | 10/2024 | Bede ........................ H02J 3/32 |
| 2001/0054887 | A1 | 12/2001 | Baretich et al. |
| 2003/0052658 | A1 | 3/2003 | Baretich et al. |
| 2004/0119448 | A1 | 6/2004 | Wiegand et al. |
| 2007/0052397 | A1 | 3/2007 | Thompson et al. |
| 2008/0197819 | A1 | 8/2008 | Thompson et al. |
| 2009/0140576 | A1 | 6/2009 | Yu et al. |
| 2009/0219001 | A1 | 9/2009 | Kimura |
| 2011/0254594 | A1 | 10/2011 | Sander |
| 2013/0009591 | A1 | 1/2013 | Demetriades et al. |
| 2013/0181526 | A1 | 7/2013 | Iwasaki et al. |
| 2013/0314045 | A1 | 11/2013 | Feuerstack et al. |
| 2014/0375125 | A1 | 12/2014 | Ye et al. |
| 2015/0184639 | A1 | 7/2015 | Goessling et al. |
| 2015/0263569 | A1 | 9/2015 | Brogan et al. |
| 2015/0280556 | A1 | 10/2015 | Bari et al. |
| 2015/0354539 | A1 | 12/2015 | Goessling et al. |
| 2015/0372481 | A1 | 12/2015 | Roesner et al. |
| 2016/0105042 | A1 * | 4/2016 | Taylor ................ H01M 10/446 320/134 |
| 2016/0164299 | A1 | 6/2016 | Becattini et al. |
| 2016/0261123 | A1 | 9/2016 | Rapp |
| 2016/0336928 | A1 * | 11/2016 | Kuznetsov ................ H02J 3/30 |
| 2016/0359329 | A1 | 12/2016 | Kim et al. |
| 2017/0054306 | A1 | 2/2017 | Vo et al. |
| 2017/0214321 | A1 | 7/2017 | Li |
| 2018/0026534 | A1 | 1/2018 | Turcan |
| 2018/0026550 | A1 | 1/2018 | Dent |
| 2018/0034399 | A1 | 2/2018 | Bando et al. |
| 2020/0007021 | A1 | 1/2020 | Chen et al. |
| 2020/0141392 | A1 | 5/2020 | Damgaard et al. |
| 2020/0144949 | A1 | 5/2020 | Bando et al. |
| 2020/0220448 | A1 | 7/2020 | Chen et al. |
| 2020/0235665 | A1 | 7/2020 | Ito et al. |
| 2021/0151811 | A1 | 5/2021 | Damgaard |
| 2021/0215137 | A1 | 7/2021 | Damgaard et al. |
| 2021/0257839 | A1 | 8/2021 | Takahiro et al. |
| 2021/0271276 | A1 | 9/2021 | Seok et al. |
| 2022/0163014 | A1 | 5/2022 | Damgaard et al. |
| 2022/0320894 | A1 * | 10/2022 | Bede ........................ H02J 3/32 |
| 2023/0223604 | A1 * | 7/2023 | Maarbjerg .......... H02M 7/4835 324/426 |
| 2023/0378761 | A1 | 11/2023 | Damgaard |

FOREIGN PATENT DOCUMENTS

| | | |
|---|---|---|
| KR | 20070099626 | 10/2007 |
| WO | WO2015157600 | 10/2015 |

* cited by examiner

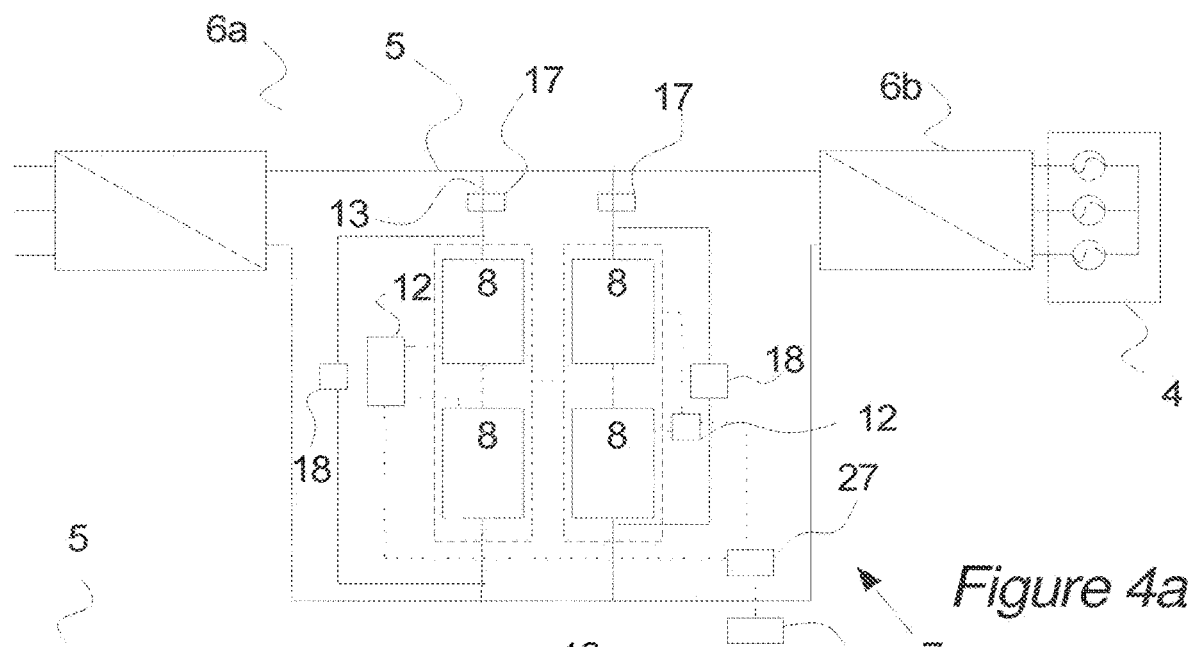
*Figure 4a*
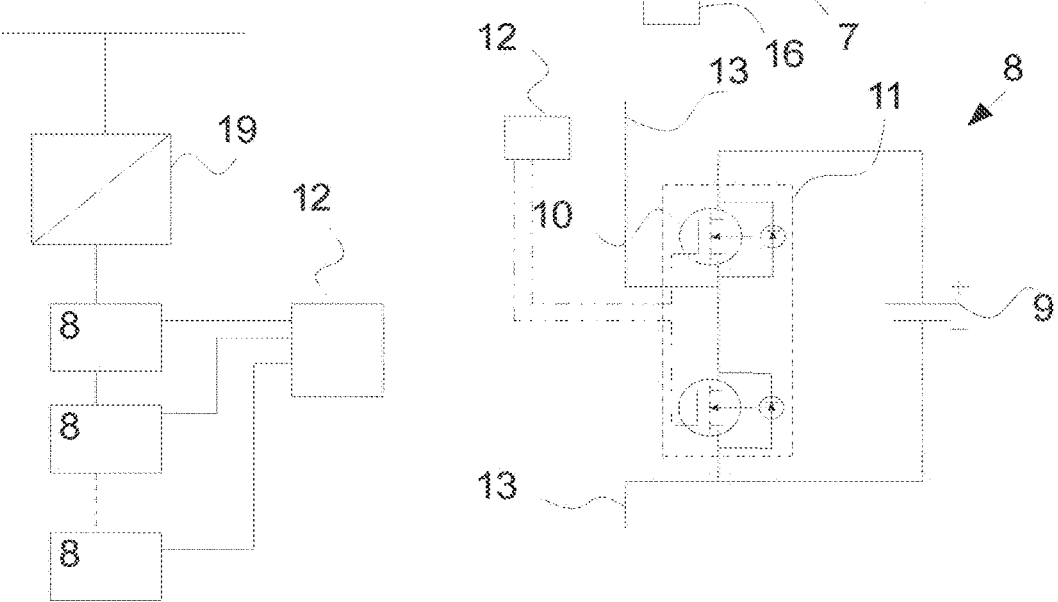
*Figure 4c*              *Figure 4b*

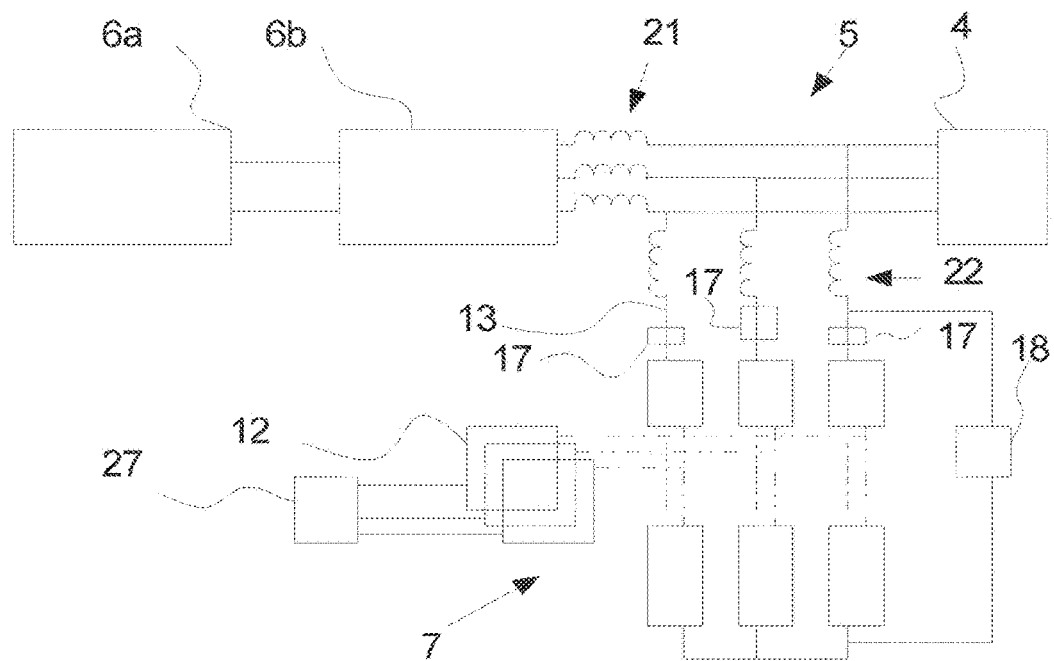
*Figure 5a*
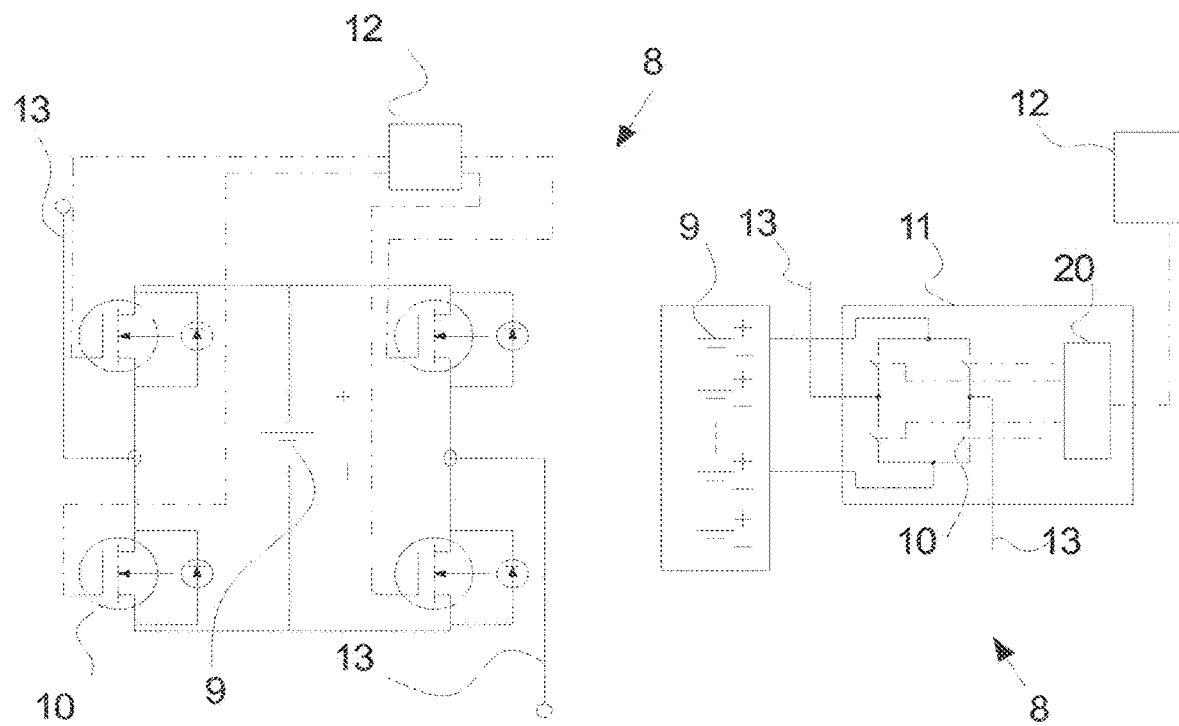
*Figure 5b*
*Figure 5c*

WIND TURBINE WITH INTEGRATED BATTERY STORAGE

This Application is a continuation of and claims priority to U.S. application Ser. No. 18/226,939, filed Jul. 27, 2023, which is a continuation of and claims priority to U.S. application Ser. No. 17/666,340, filed Feb. 7, 2022, now patented as U.S. Pat. No. 11,742,669, which is a continuation of and claims priority to U.S. application Ser. No. 17/056,184, filed Nov. 17, 2020, now patented as U.S. Pat. No. 11,248,586, which to claims priority PCT/DK2019/050165, filed May 24, 2019, which claims priority to Denmark Application No. PA201870314, filed May 25, 2018, the contents of all of which are incorporated herein by reference

FIELD OF THE INVENTION

The invention relates to a battery storage and wind turbine comprising a battery storage comprising a plurality of individually controllable battery cells and a method of controlling a current path through the battery cells.

BACKGROUND OF THE INVENTION

The amount of power produced by wind turbines is changing over time with wind speed. This change is independent of the consumption of power from the grid connected to the wind turbine. Therefore, various energy storage systems have been described connectable to an individual wind turbine or a wind park. One purpose of these systems is to storage energy when the wind turbine is producing and when the consumption from the grid is low, further it is to deliver power to the grid in times where the wind turbines do not produce power, but consumption from the grid is high.

WO2015102398 is one of many prior art documents disclosing a battery storage of a wind turbine. The battery storage here is connected to the DC link between a machine side and a grid side converter.

CN202011766 is one of many prior art documents disclosing a plurality of wind turbines connected to an energy storage via a bidirectional inverter.

Based on the above-mentioned prior art document representing the prior art related to storage of energy from one or more wind turbines, prior art discloses the use of conventional rechargeable batteries connected directly to the DC-link in a back-to-back converter or to the output from wind turbines via an inverter.

SUMMARY OF THE INVENTION

The present invention suggests integrating into a wind turbine a new type of intelligent controllable energy storage which can be connected either to the DC-link of a converter or to the output of a converter of a wind turbine.

The method relates to a wind turbine comprising: a rotor facilitating rotating a rotor of a generator and thereby the generation of an electric current. An electric flow path configured for conducting the electric current to an electric grid via a power converter. A battery storage electrically connected to the electric flow path, the battery storage comprising a plurality of battery cells, each battery cell comprising at least one battery element and at least two semiconductor switches. Wherein a controller is configured for controlling the voltage over the battery storage by controlling the status of the at least two semiconductor switches of a plurality of the battery cells and thereby if a current path through the battery storage is bypassing the at least one battery element of one or more the plurality of battery cells or passing through the at least one battery element of one or more of the plurality of battery cells.

Connecting the battery storage to the electric flow path is advantages in that it enables the battery storage to store at least part of the current flowing in the electric flow path or deliver current to the electric flow path depending on the voltage over the battery storage.

The current path through the battery storage is understood as an electric path which allows flow of current. The current path starts at the point of connection between the battery storage and the electric current path or at the first of a series of battery cells and ends at the last battery cell in the series of battery cells before it again returns to the electric flow path. It should be mentioned that a plurality of series of battery cells may be electric connected, hence the current path could in such embodiment be said to also return and go back up through battery cells in a parallel columns of series connected battery cells.

Depending on the status of the switches, the current path may include or exclude battery elements of the individual battery cells of the battery storage and thereby the voltage over the battery storage. The controller is selectively controlling if a particular battery cell is included or bypassed from the current path. Hence at one point in time a battery cell may be included in the current path and in a second point in time this battery cell may be bypassed and not be part of the current and in a third point in time this battery cell may again be included in the current path and so on as time goes by. The controller may control the status of the switches based on voltage or current requirements from the current path to which the battery storage is connected, load distribution among battery cells, state of charge, state of health, temperature, etc. This voltage also determines if current flows from the electric current path towards the battery storage or from the battery storage towards the electric current path.

Controlling the voltage over the battery storage is advantages in that it has the effect, that flow of current to and from the battery storage can be controlled and thereby 15 if the battery storage is charged (preserving energy) or discharged (deliver energy).

The battery storage is advantageous in that it has the effect that it can be connected to both an AC voltage or a DC voltage of the electric flow path.

The status of a semiconductor switch should be understood as either a conducting mode where the switch is closed allowing current flow through the switch or a non-conducting mode where the switch is open preventing current flow through the switch.

Preferably, the controller is controlling the status of semiconductor switches of a plurality of battery cells. This is advantageous in that it has the effect, that the current path through the battery storage can be changed dependent on a voltage over the battery storage (determined based on the reference current), condition of the switches, condition of the battery cells, desired voltage of the battery storage (DC or AC and voltage level hereof e.g. 24V, 230V, 400V, etc.) etc. Accordingly, controlling the status includes selectively control a series of activating (passing the current path through) and deactivating (bypassing the battery cell) the battery cells. Thereby it is possible to establish the voltage that is required at a given time e.g. a real-time demand and not only a predetermined voltage and this from a non-predetermined configuration of the battery cells of the battery storage.

According to an embodiment of the invention, the controller is selectively controlling the switches and thereby the current path. This is advantageous in that after one battery cell has been bypassed, it can be passed by the current path again when needed.

According to an embodiment of the invention, the at least two semiconductor switches of each of the plurality of battery cells are mounted on a printed circuit board, wherein the printed circuit board is part of a control signal path between the controller and the at least two semiconductor switches, and wherein the printed circuit board is part of the current path through the battery cell.

Mounting the semiconductor switches on a PCB (PCB; Printed Circuit Board) is advantageous in that complexity in mass production is reduced and easy scaling of the size of the battery storage is facilitated.

The downside of building a battery storage of a plurality of battery cells comprising PCB mounted switches is that the size of the switches (in terms of possible load current through the single switch) is reduced. This will lead to an increased number of battery cells compare to embodiments using larger size switches not PCB mounted. On the other hand, the smaller size switches are cheaper, this together with the reduced costs of mass production of battery cells and the added flexibility in battery storage design compensate for the increased number of battery cells.

As an alternative to mounting on a PCB, the switch can be mounted on a bus bar or laminated bus bar.

According to an embodiment of the invention, the control signal path and the current path is galvanic isolated. It is advantages to be able to separate the high voltage variations (e.g. ±1 OOOV) over the switches occurring depending on the status of the switches, from the control signals controlling the status of the switches. This has the effect that the high voltage do not disturb the control signals.

The galvanic isolation is preferably facilitated by means of optic data communication, transformers, etc. somewhere at the control signal path between the 5 switch and the controller. Preferably at the controller end or at the interface of the control signal path and the PCB.

According to an embodiment of the invention, the converter comprises a generator side converter and a grid side converter connected via a direct current link. In case the converter is not a back to back type converter, the battery storage is connected to the electric flow path between the converter and the grid.

According to an embodiment of the invention, the battery storage is connected to the electric flow path between the grid side converter and the electric grid. This is advantages in particular if the converter is a full-scale converter because it is easy to retrofit and facilitates reduction of harmonic current towards the grid.

The positive result in connecting the battery storage to an AC voltage without an AC/DC converter was surprising to the inventors, in that it turned out that no deterioration of the battery elements of the battery cells occur due to the changing AC voltage pulses changing at least every second and often every millisecond.

According to an embodiment of the invention, the battery storage is connected 20 to the electric flow path at the DC link between the generator side converter and the grid side converter. This is advantageous if the converter is a full-scale and in particular if the converter is for a wind turbine comprising a DFIG generator in that this solution is cheaper than the solution mounted after the converter.

According to an embodiment of the invention, the battery storage is connected the positive and negative rails of the direct current link via a DC/DC converter. This is advantageous in that the DC-link voltage can be kept more stable and controlled which is advantageous if an existing converter should be retrofitted with a battery storage.

According to an embodiment of the invention, the controller is configured for controlling the status of the at least two semiconductor switches of a plurality of the battery cells thereby regulating the voltage over the battery storage, wherein the voltage is regulated based on a difference between a reference current established by the controller and a measured current provided to the controller, wherein the measured current represents the current conducted in the current path between the electric current path and a first battery cell of a column of series connected battery cells of the battery storage.

This is advantages in that it has the effect, that current flow to and from the battery storage can be controlled. Hence if the reference voltage of the battery storage and thereby the voltage over the battery storage is below the voltage of the electric flow path, current will flow to the battery storage and charge the battery elements. If the reference voltage of the battery storage (and thereby the voltage over the battery storage) is above the reference voltage, current will flow from the battery storage e.g. to the grid or power consuming activity of the wind turbine such as startup of the wind turbine (the battery elements are discharged). If the reference voltage of the battery storage (and thereby the voltage over the battery storage) is equal to the voltage of the electric current path, no current flow is established in the system and status que is maintained in the battery storage. It should be mentioned, that the voltage of the electric flow path is the voltage at the electric flow path where the battery storage is connected hereto.

The reference current is preferably derived by the controller from a power reference received from an external controller. However, the reference current may also be received by the controller from the external controller.

In a three-phased system, to each phase a column of series connected battery cells are preferably connected. Hence, the measured current can be found from a simple measurement between the electric current path and the first battery cell in any of these three columns. Measuring the current in real-time reflects the real-time status of the electric current path i.e. whether discharge or charging of the battery storage is happening.

The current is preferably measured between the battery storage and where it is attached to the electric flow path. The current sensor may be a conventional current sensor facilitating measuring a DC and/or AC current. The measured current may be derived from knowledge of voltage and power which may be measured at the electric current path.

According to an embodiment of the invention, an external controller facilitates establishing the reference current in dependence of status of the utility grid or requirements to deliveries to the utility grid from the wind turbine.

Preferably the external controller provides the reference current to the controller. This is advantageous in that it has the effect, that the operation of the wind turbine can be operated more flexible and comply with a wider range of requirements from the utility grid. Such requirements may include delivery of a determined amount of power, preserving an amount of power for standby, storing produced power during grid drop/faults.

According to an embodiment of the invention, the battery storage comprises a plurality of columns of battery cells, wherein the semiconductor switches of the battery cells of each column is controlled by individual controller and wherein a master controller facilitates control of each of the individual controllers.

Hence, preferably each column of battery cells is controlled by on controller accordingly, in case of e.g. three columns of battery cells, three controllers may be used one for each column. A master controller may then be used to coordinate control between each of these controllers. This is advantageous in that it has the effect, that if a controller do not have enough legs to be able to connect and thereby control the switches, more controllers can be used. Further, it has the effect, that if a controller controlling a fist column (i.e. phase) fails, the remaining columns can continue operating. Further, it has the effect, that if each phase (i.e. column) is installed in individual panels, then one controller can be used in each panels thereby long wire connections can be avoided.

According to an embodiment of the invention, the battery cells comprise between 1 and 20 battery elements, preferably between 5 and 18 battery elements, most preferably 7 or 17 battery elements. The number of battery elements is determined based on required capacity of the battery storage, operation parameters of the system, etc. Preferably, the battery elements of the battery cell are connected in series.

According to an embodiment of the invention, the battery storage comprise one column of series connected battery cells for each phase connected to the battery storage, wherein at least one battery cell in each column is connected to at least one battery cell in a neighboring column. Having only one column of series connected battery cells is advantages in that it has the effect, that the battery storage is cheaper.

According to an embodiment of the invention, each of the battery cells comprise four semiconductor switches and at least one battery element. This configuration of the battery cell is advantageous in that it has the effect, that the one switch pair including switch 1 Oa and 1 Ob is controlling the current to and from the battery element in a first half of a period of the AC voltage signal and a second switch pair including switch 1 Oc and 1 Od is controlling the current to and from the battery element in a second half of a period of the AC voltage signal.

The four switches are preferably configured in a H-bridge with the battery element located in the middle. This configuration of the battery cell is advantageous in that the polarity of the current in the point of connection of the battery storage to the electric flow path can be changed. Accordingly, a H-bridge configuration is particular advantageous when the battery storage is connected to the AC part of the electric flow path.

According to an embodiment of the invention, the battery storage is connected 25 to the wind turbine via a first UPS switch and a second UPS switch.

According to an embodiment of the invention, an UPS controller is configured for controlling the first and second UPS switches so as to provide an AC voltage to a load in case of grid fault, wherein the AC voltage is generated by the strings of battery cells of the battery storage wherein each of the strings of battery cells is controlled a controllers.

According to an embodiment of the invention, the controller or battery storage controller is configured for bypassing the switches controlling a battery cell by control of a PCB bypass switch.

According to an embodiment of the invention, the PCB bypass switch is implemented on the PCB.

According to an embodiment of the invention, the controller is configured for controlling the switches of the battery storage so as to allow only one battery cell to be charged at the time.

Moreover, the invention relates to a method of controlling the flow of current to and from a battery storage electrically connected to a converter of an energy generator. The energy generator is generating an electric current, the electric current is conducted to an electric grid via an electric flow path through the power converter. The battery storage is electrically connected to the electric flow path. The battery storage comprises a plurality of battery cells, each battery cell comprises at least one battery element and at least two semiconductor switches. Wherein a controller is controlling the voltage over the battery storage by controlling the status of each of the at least two semiconductor switches, and thereby controlling a current path through the plurality of battery cells.

This is advantageous in that it has the effect that a desired voltage can be generated over a series of battery elements of the battery storage and thereby control of current flow to and from the battery storage is obtained.

According to an embodiment, the controller establishes a current error between a current reference of a desired current in the current path and a measured current in the current path. Wherein the controller establishes a voltage refence based on the current error, and wherein the controller establishes the voltage over the battery storage by establishing a plurality of gate signals for controlling the status of the semiconductor switches and thereby the current path through one or more battery elements.

The above-mentioned wind turbine and method of controlling the current flow to and from the battery storage of an energy generator is advantageous over traditional topologies/technology in that it is cheaper and thereby a reduction of capex for wind turbine owners I operators/manufactures is obtained. Also, since the present battery storage it is easy to replace and install (e.g. retrofit) operating expenses (opex) is reduced. Also, the reliability of operation of the wind turbine is increased compared to traditional technology in that a damaged battery element can be bypassed which will not influence the operation of the wind turbine.

The current reference may be established m an external controller and provided to the controller or established in the actual controller e.g. based on a power reference. Preferably, the reference current is the desired current in the current path determined by the grid operator.

The voltage reference is preferably established by means of a closed loop controller such as a Proportional Resonant or a Proportional Integral Derivative controller.

According to an embodiment of the invention, the voltage refence is at least partly established based on state of charge of the battery elements.

This is advantages in that it has the effect that the state of charge of each of the battery elements can be kept substantially the same. In addition, the voltage reference and thereby the status of the switches can be controlled at least partly according to knowledge state of health of the switches or the battery elements. This is advantageous in that it has the effect, that the remaining lifetime of the switches and the battery elements can be more or less the same and the load especially of the battery elements can be distributed according to a desired pattern. Preferably, the switches are mounted on a printed circuit board.

According to an embodiment of the invention, the energy generator is a wind turbine or a solar system.

Moreover, the invention relates to a battery storage electrically connected to the electric flow path of an energy system comprising an energy generator and a load, the battery storage comprising a plurality of battery cells, each battery cell comprising at least one battery element and at least two semiconductor switches, wherein a controller is configured for controlling the voltage over the battery storage by controlling the status of the at least two semiconductor switches of a plurality of the battery cells and thereby if a current path through the battery storage is selectively: bypassing the at least one battery element of one or more the plurality of battery cells or passing through the at least one battery element of one or more of the plurality of battery cells.

The energy generator is preferably a wind turbine or solar system but could also be a so-called black energy generator connected to the utility grid and the electric flow path is preferably starting the generator and ending at a load. Hence the battery storage of the present invention may be connected anywhere between where the energy is generated and where it is used.

According to an embodiment of the invention, the battery storage comprising the features of one or more of the claims 2-19.

According to an embodiment of the invention, the battery storage is connected to the electric flow path via a first UPS switch and a second UPS switch.

According to an embodiment of the invention, an UPS controller Is configured for controlling the first and second UPS switches so as to provide an AC voltage to a load in case of grid fault.

THE DRAWINGS

Figure 2:
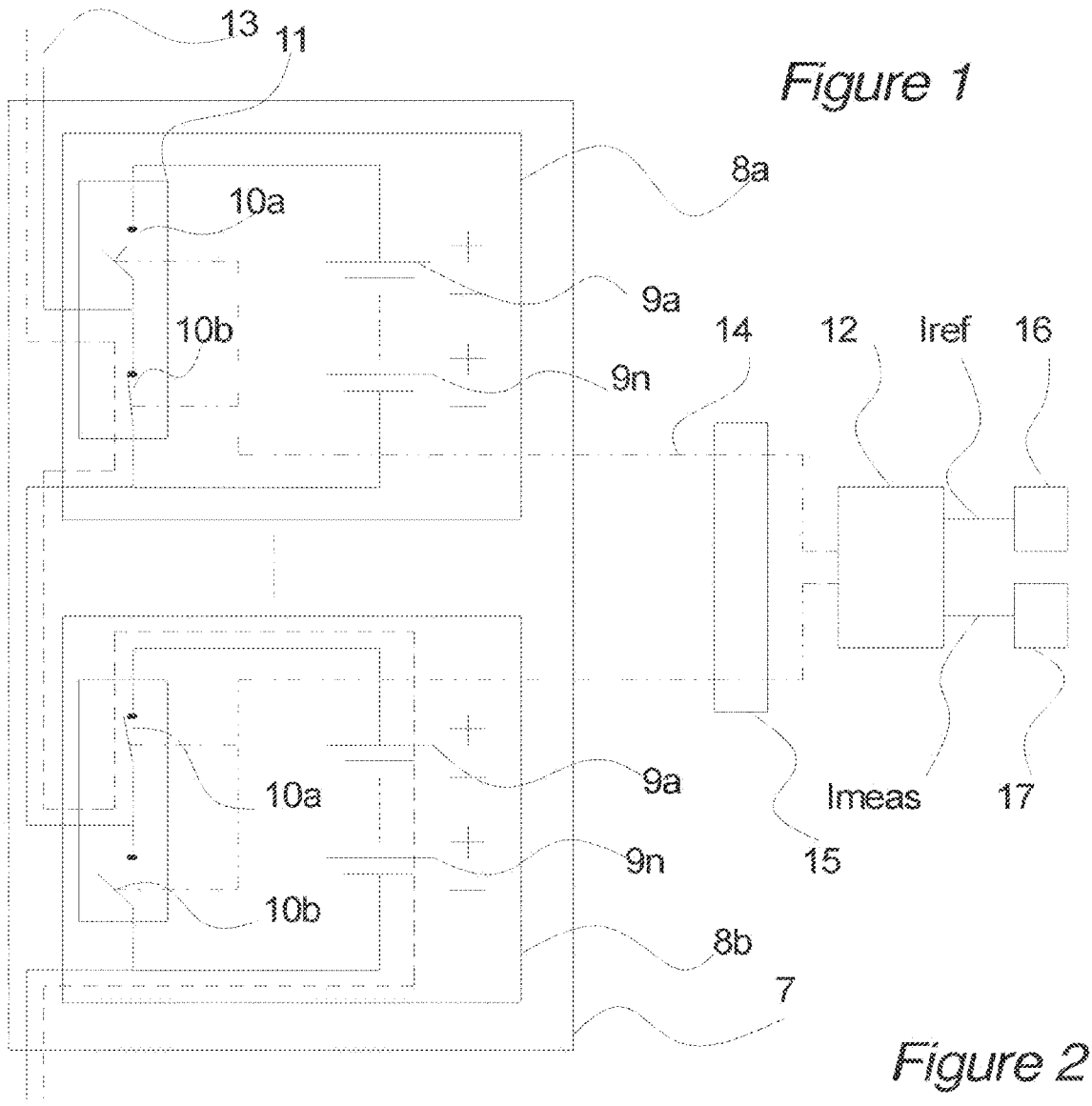
Figure 3:
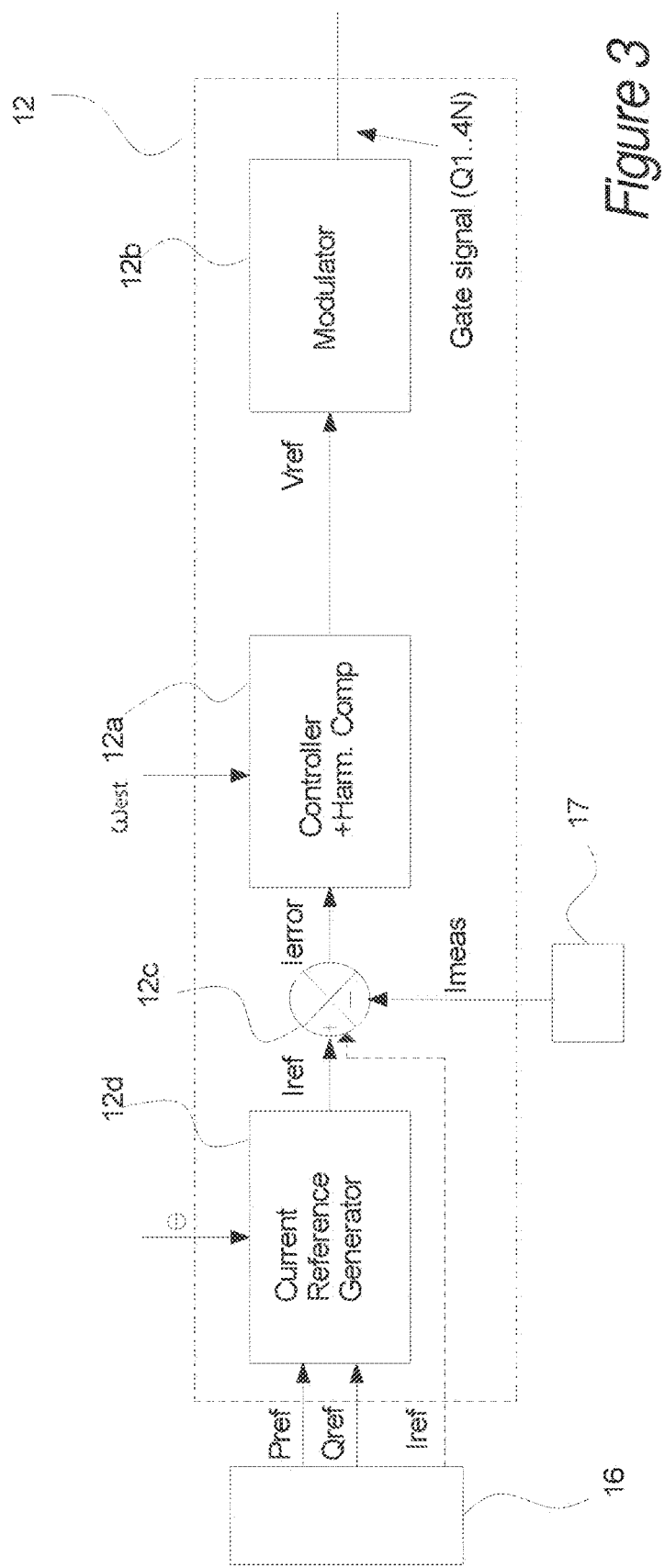
Figure 6A:
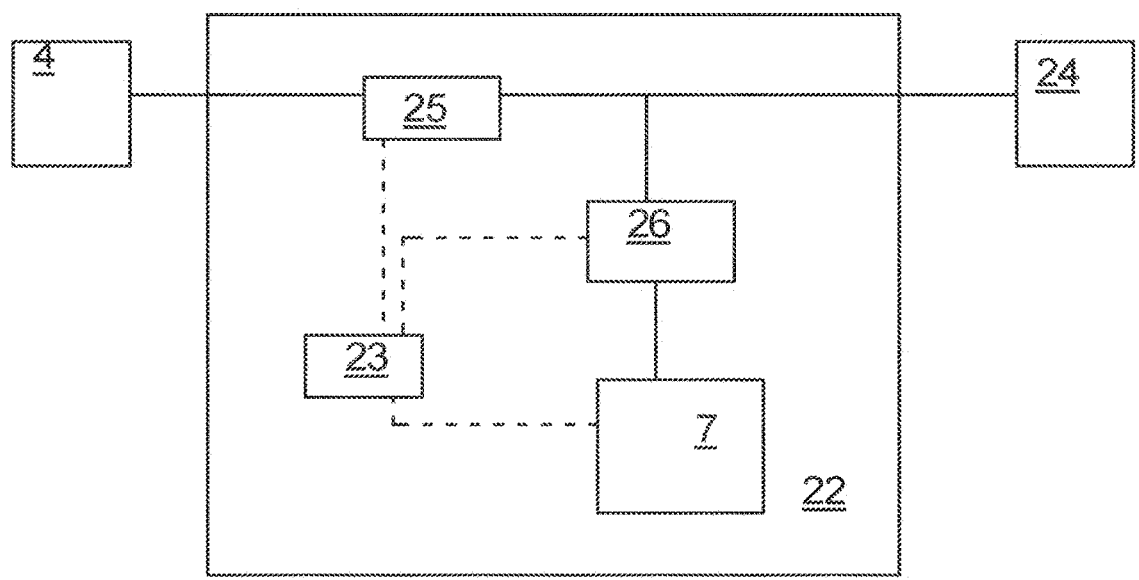
Figure 6B:
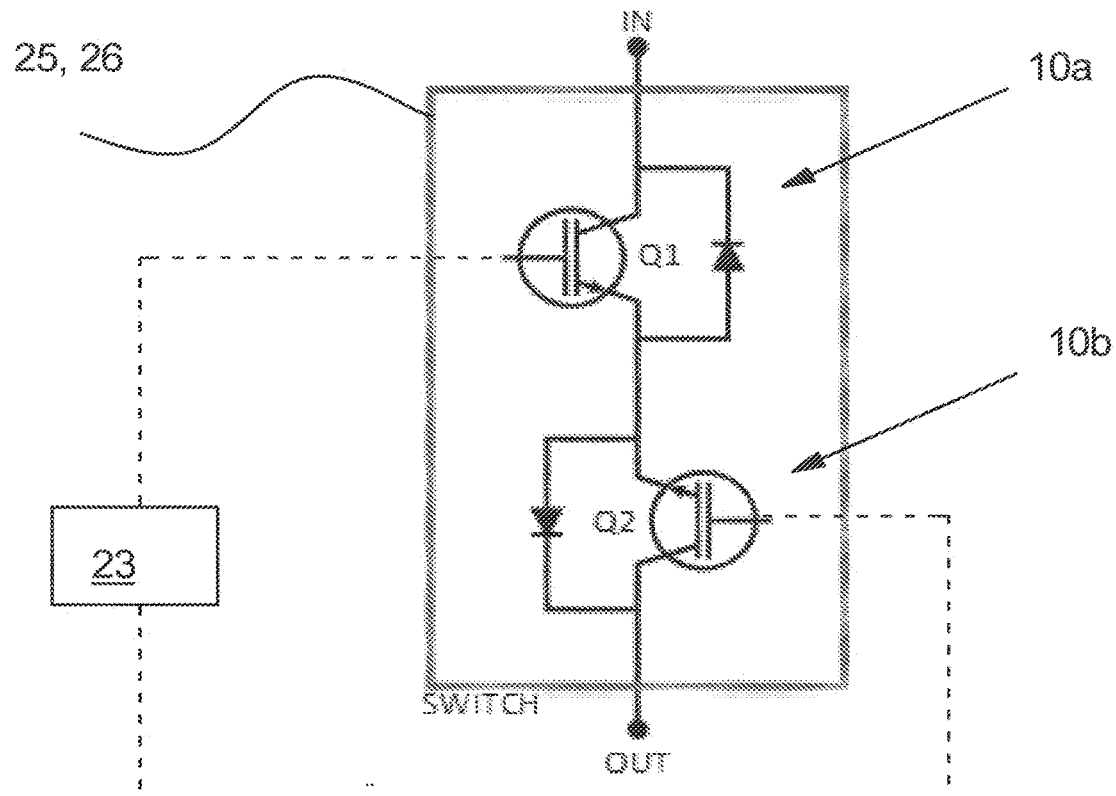
Figure 6C:
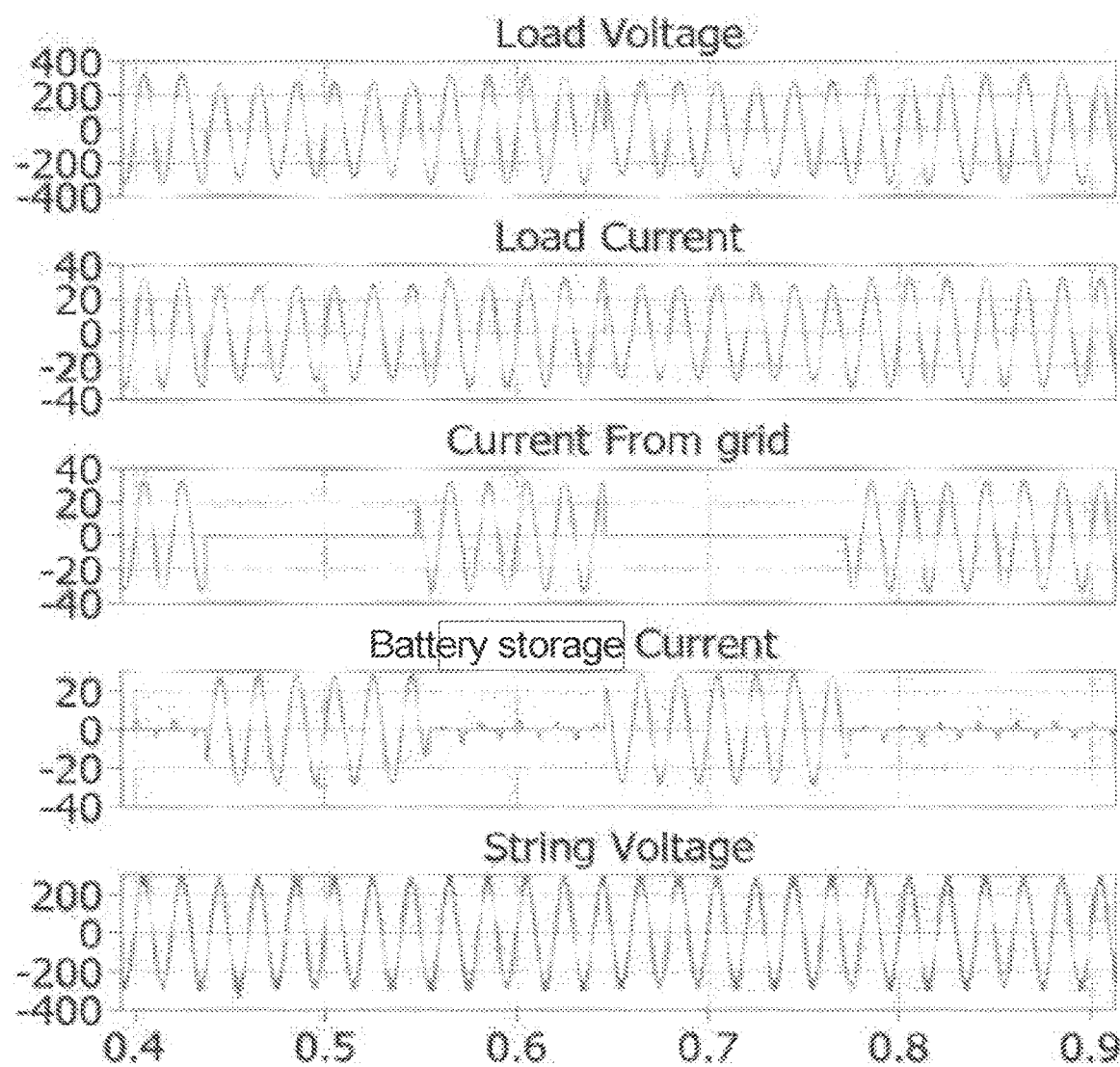
Figure 7:
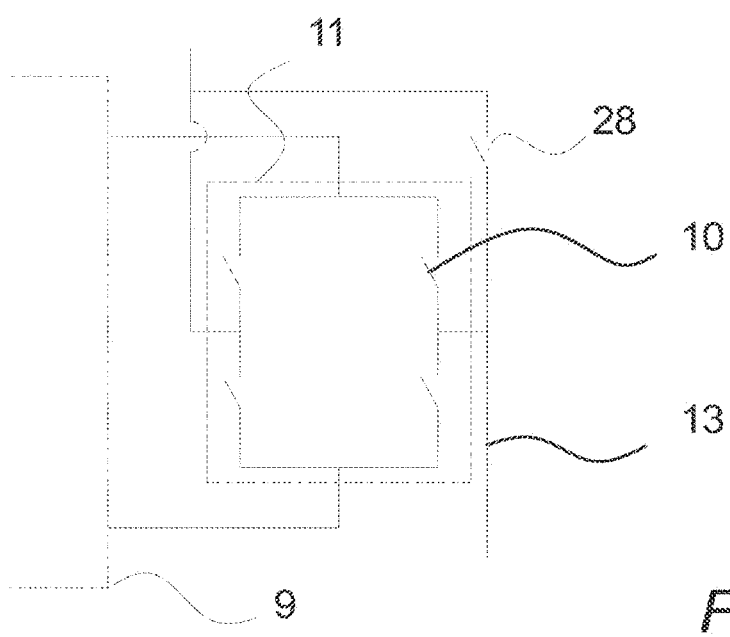

For a more complete understanding of this disclosure, reference is now made to the following brief description, taken in connection with the accompanying drawings and detailed description, wherein like reference numerals represent like parts:

FIG. 1 illustrates two locations of the battery storage relative to a converter, FIG. 2 illustrates part of a battery storage according to an embodiment of the invention, FIG. 3 illustrates control principle of a battery storage according to an embodiment of the invention, FIG. 4*a*-4*c* illustrates a battery storage mounted in the DC link in a back to back converter, FIG. 5*a*-5*c* illustrates a battery storage mounted between converter and grid according to an embodiment of the invention, FIGS. 6*a*-6*c* illustrates a battery storage used as an inline UPS, and FIG. 7 illustrates an fault tolerant switchboard.

DETAILED DESCRIPTION

FIG. 1 illustrate elements of a wind turbine 1 relevant for the present invention. The wind turbine 1 comprises a rotor 2 which via a shaft is connected to the rotor of a generator 3. Hence, the generator is generating a current at its output when its rotor is rotated. The output of the generator 3 is connected to a first end of an electric current path 5 the second end of which is connection to the utility grid 4. Between the generator 3 and the utility grid 4 a converter is located in the electric current path 5. The converter 6 comprises a generator side converter 6*a* connected to a grid side converter 6*b* via a direct current (DC) link.

The battery storage 7 can be used in relation to all types of energy systems including wind turbine converters including DFIG (DFIG; Doubly Fed Induction Generator) converters, Full power 2 level back-to-back, Full power 3 level back-to-back, MMC (MMC; M Modular Multi-Level Converter), etc. The battery storage 7 can be located between the converter 6 and the grid 4, in fact, it can be connected either in the de link or between the converter and the transformer including a stator path of a DFIG configuration, in fact, it can be place on any AC or DC power line. Further, the battery storage 7 can be used in relation to all types of wind turbine generators including Induction Generator, Permanent hlagnet Sync. Generator, Doubly Fed Induction Generator, Synchronous Generator, etc. Further, the battery storage 7 can be used external to a wind turbine or other renewably energy generation systems.

Further, FIG. 1 illustrates two battery storages 7 connected to the electric current path 5. It should be mentioned that typically only one battery storage 7 will be connected to the electric current path 5, hence the illustration on FIG. 1 only served to illustrate where at the electric current path 5, the battery storage 7 preferably can be connected. With this said two or more parallel battery storages can be connected to facilitate charging and discharging at the same time.

FIG. 2 illustrates the principles of the design of a battery storage 7 including the minimum elements of the battery storage 7. The battery storage 7 is built of a plurality of battery cells 8. Each of the battery cells 8 comprise at least two semiconductor switches 10*a*, 10*b* and at least one battery element 9. The status of the semiconductor switches 10 is controlled by a controller 12 and thereby, the controller is controlling a current path 13 through (preferably) each of the battery cells 8 of the battery storage 7. It should be mentioned, that the current path 13 is also considered passing through a battery cell 8 even though the battery element 9 hereof is by-passed.

The way of the current path 13 through the battery storage 7 is determined by the status of the semiconductor switches 10 and is therefore controlled by the controller. The status of the semiconductor switches 10 is determined based on availability of battery elements/cells 8, 9, health status of the battery elements/cells 8, 9, state of charge of the battery elements cells 8, 9, charging voltage available, desired/required voltage across/from the battery storage 7, health/wear of switches, etc. The status of a semiconductor switch 10 is changed between a conducting mode (switch closed) and a non-conducting mode (switch open). A deadtime between change from one status of the switch to another status is preferably adjustable between 10 nanoseconds and 1 microsecond, typically the value is a couple of 100 nanoseconds.

The availability of a battery element 9 may refer to a defect battery element, in this case a battery cell 8 will not be available. The health status of a battery element may refer to the number of times the particular battery element 9 has been charged/discharge. The high number, the closer to end of life time of the battery element 9 hence, the controller 12 may keep track of this number and activate battery cells 8 trying to keep this number more or less the same for all battery elements 9 of the battery storage 7. In the same way, health of switch can also be estimated based on the number of times it has been switches. The most important parameter for determining status of the switches 10 is as described the voltage over the battery storage 7 the determination of which can be described in relation to FIG. 3 below.

The battery storage 7 illustrated in FIG. 2 comprises a first battery cell 8a and a second battery cell 8b each including a plurality of battery elements 9a, . . . , 9n. The battery elements 9a-9n of the first battery cell 8a are bypassed because of the nonconducting status of switch 1 Oa and the conducting status of switch 1 Ob. The battery elements 9a-9n of the second battery cell 8b is included in the current path 13 because of the conducting status of switch 1 Oa and the non-conducting mode of switch 1 Ob.

The status of the switches 10 is as mentioned controlled by controller 12 communicating with the switches 10 via control signal path 14. The controller 12 is preferably also connected to an external controller 16 which may be implemented as a wind turbine controller or wind park controller. The controller 12 is described in further details in relation to FIG. 3. Further, as illustrated the controller 12 preferably also receives input from a current sensor 17 which is implemented in the current path The current path 13 need to be galvanic separated from the control signal path 14 in order not to disturb the control of the status of the switches 10. On FIG. 2 the galvanic separation 15 is illustrated at the controller 12, however this is just an example and it could as well be at the battery storage 7, at the battery cell 8 or the printed circuit board 11 (if any) on which the switches 10 are mounted. The galvanic separation can be established by optic data communication, optoelectrical data communication, by 10 means of a transformer. It should be mentioned, that FIG. 2 illustrates an example of series connected battery cells 8 which would be referred to as a string. A battery storage 7 may comprise more strings and in this case preferably each string has its own controller 12. In this case these string controllers 12 may communicate with a battery storage controller (not illustrated) which again may communicate with the external controller 16.

The number of battery cells 8 of a battery storage 7 may vary between 1 and or even more, typically the battery cells 8 are series connected in columns in the battery storage 7 where each column typically comprises between 5 and 20 battery cells 8. The number of battery cells 8 and thereby battery elements 9 is determined by 20 the desired voltage over the battery storage 7 which is preferably higher than the peak voltage of the grid 4. The storage capacity of the battery storage 7 is determined by application in which the battery storage 7 is used. Further, the number of battery elements of the battery cells may vary like the battery cells 8 does not have to be identical within the battery storage 7 and even not within the strings. Just as long as the string controller 12/batter storage controller is updated with information of what is behind the individual PCB switch boards 11.

Preferably, the switches are preferably semiconductor switches 10 of the IGBT (IGBT; Insulated Gate Bipolar Transistor), MOSFET (MOSFET; Metal-Oxide-Semiconductor Field-Effect Transistor) type, GaN transistors (Gan; Gallium Nitride) or SiC transistors (SiC; Silicon Carbide), however other types of switches can also be used.

Preferably, commodity switches 10 are chosen in that they are well tested and low in price. The commodity switches are typically not designed for operation in high voltage (e.g. above 1000V) and with high currents (e.g. above 500 A) so the number of this type of switches is higher compared to designs using switches designed for higher voltage and currents. However, the increased number is compensated by the lower price of the commodity switches. A preferred type of switch 10 for use in the present invention is designed to currents of 100 A and voltages of 50V. At higher voltages of the preferred types of switches, the on-resistance of the semiconductor switch 10 is increasing and thereby the power loss in the switch 10.

Preferably, a reference to battery element 9, is a reference to a plurality of battery elements connected in series. The number of battery elements may vary, between 2 and 25 or even more in one column of series connected battery elements 9. A typical column comprises between 10 and 20 series connected battery elements 9. The number of battery elements 9 in a column depends on requirements of the battery storage 7 and according to a compromise between few cells 9 leads to low price and reduced power loss while many cells 9 reduces the harmonic current contribution and leads to a more reliable system in that the redundancy/flexibility in control is increased.

The battery elements 9 are preferably of the li-ion type since the characteristics of this battery type complies with the requirements of the battery storage 7 and the environment of a wind turbine. With this said, other battery types may also be used. As an example, one battery element 9, may be a 3.2V element which when connected with e.g. 14 similar elements 9 leads to a 48V battery pack within one battery cell 8. Hence in this example, the battery cell 8 comprise one 48V battery which can be controlled by the switches 10 of the battery cell 8. The capacity of the battery elements 9 is preferably between 10 Ah and 200 Ah or even higher, but as mentioned this is a design choice based on requirements to the battery storage 7 and prices of the system. Especially in the preferred embodiment where the switches 10 are mounted on a PCB, the maximum current is determined as the lower of the maximum current allowed through the current path of the PCB and the maximum battery current. In case the semiconductors 10 are not mounted on the PCB the current limiting factor is the current limit of the converter.

FIG. 3 illustrates an embodiment of the invention wherein the battery storage 7 is used as energy storage in a AC system. The embodiment illustrates the controller 12 and how the voltage over the battery storage 7 is controlled according to an embodiment of the invention. In a preferred embodiment, the controller 12 comprise a control module 12a, a modulator module 12b and an subtraction node 12c. In addition, the controller 12 may also comprise a current reference generator 12d, the current reference generator 12d is only relevant in the situation where the controller 12 itself needs to establish a reference current Iref i.e. the current which is desired in the current path 13 between the electric current path 5 and the battery storage 7.

Preferably, the external controller 16 such as a wind turbine controller provides to the controller 12 the power reference such as a real and/or a reactive power reference or alternatively a reference current Iref In this situation, the current reference generator 12d establishes the reference current Iref from based on the information received from the external controller 16. If there are several strings, as mentioned, the external controller 16 communicates with a not illustrated battery storage controller which again communicates with the string controllers 12

As mentioned, the reference current Iref is the desired current in the current path 13 between the electric current path 5 and the battery storage 7. Hence, the reference current Iref is the deciding parameter for the current flow to and from the battery storage 7. Accordingly, the reference current Iref may be determined based on various different scenarios preferably established by requirements from the operator of the utility grid 4. One very simple example is that the wind turbine 1 is producing 1.5 MW and the utility requires 2 MW in this situation, the missing 0.5 MW must come from the battery storage 7. Accordingly, the reference current Iref is determined at a level leading to a current flow from the battery storage 7 towards the electric current path according to the method described below.

The actual current Imeas in the current path 13 between the electric current path 5 and the battery storage 7 is established preferably by means of a simple current measurement made by a current sensor 17. It is the polarity of the reference current Iref which is determining for the direction of the current flow to (charging) or from (discharging) the battery storage 7. It is the difference between the reference current Iref and the measured current Imeas that in the controller 12 is used to determine the voltage over the series on battery cells 8 and thereby which (or the number) of the battery elements 9 that has to be part of the current path 13 and which (or number) of the battery elements 9 that has to be by-passed.

Accordingly, if Iref is larger than Imeas then current should run into the battery storage 7, if Iref is minor than Imeas then current should run out of the battery storage 7 and if Iref is equal to Imeas no current should flow.

The desired current flow is determined by the error!error found between Iref and Imeas at the subtraction node 12*c*. ! error is used by the control module 12*a* to generate a voltage reference Vref i.e. a voltage over the battery storage 7 which will initiate the desired current flow. The control module 12*a* may be implemented as a PR controller (PR; Proportional Resonant), a PID controller (PID; Proportional Integral Derivative) or other suitable controllers based on a control loop feedback.

The voltage reference Vref is then by the modulator module 12*b* converted to a plurality of gate signals for controlling the status of the switches 10 of the individual battery cells 8. Thereby a status pattern of the switches 10 in the individual battery cells 8 required to establish the voltage reference Vref over the battery storage 7 is created. Examples of where this voltage reference Vref over the battery storage 7 is measured is found on FIG. 5*a* over the grid sider filter 21 and output inductors 22.

The current flow in the current path 13 is determined by the voltage over the battery storage 7 and the voltage of the electric current path 5. The voltage of the electric current path 5 can be established by knowledge of power, current or simple voltage measurements made by a voltage sensor. The voltage of the electric current path 5 can be found e.g. from a measurement of the DC voltage in the DC link, voltage between a phase or zero potential, etc. Hence, to be able to control the current flow to and from the battery storage 7, the battery storage voltage has to be higher than the voltage of the electric current path to which the battery storage is connected. The current control is made by the switches 10. If the switches does not have an embedded diode, such diode should be implemented separately.

Due to the current measurement inputted to the feedback control loop of the controller 12, the current error Ierror and thereby the voltage reference Vref and finally the status pattern of the switches is continuously updated.

As mentioned, if not all battery cells 8 are needed to establish the desired voltage reference Vref/voltage over the battery storage 7, the controller 12 may not use the battery cells 8 which have been used the most. Thereby controller 12 is able to distribute the load equal to all battery cells 8.

FIG. 4*a* illustrates an example of how the battery storage can be integrated in the converter 6 of a wind turbine 1. As illustrated, the battery storage 7 is connected to the electric flow path 5 in the DC link between the generator and grid side converter 6*a*, 6*b*. The embodiment of FIG. 4*a* illustrates two columns/strings of series connected battery cells 8 together forming the battery storage 7. The switches 10 of the strings are controlled by individual string controllers 12 communicating with a battery storage controller 27 which again is communicating with an external controller 20 16. This configuration illustrates one way of implementing the battery storage, hence other configuration are possible as well as other points of connection of the battery storage 7 to the electric current path 5, grid 4, load 24, etc. As indicated by the dotted lines between the two battery cells 8 a battery storage 7 may comprise further columns of series connected battery cells 8.

One controller 12 for controlling all of the battery cells 8 is possible, but as mentioned one per string is preferred and hence not the only possibility of controlling the battery storage 7. Further, one current sensor 17 is illustrated for measuring the current (Imeas) in the current path 13 between the battery storage 7 and the electric flow path 5, however this is not the only possibility for measuring this current. Further, one voltage sensor 18 is illustrated for measuring the voltage (Vref) over the battery storage 7, however this is not the only possibility for measuring this voltage.

The battery storage 7 can be integrated in the converter between the positive and negative DC rail of the DC link as illustrated on FIG. 1 and FIG. 4*a*. The implementation of the battery storage 7 as illustrated on FIG. 4*a* is advantageous in that it may be cheaper and facilitate an UPS functionality when e.g. grid faults occur.

FIG. 4*b* is a preferred illustration of an electric diagram of a battery cells 8 for use in a battery storage 7 connected to a DC part of the electric flow path 5. The illustrated battery cell only comprises two semiconductor switches 10. As illustrated, the semiconductor switches 10 includes a diode, however this is due to the fact that the illustrated semiconductor switch 10 is of the MOSFET type which includes an internal body diode. Preferably, the two semiconductor switches 10 are mounted on a PCB 11 as illustrated.

The reason for only having two semiconductor switches 10 is that the battery storage 7 is connected to the DC link and therefore only is charged with current having one polarity and deliver current with the same polarity. This in contrary to the embodiment illustrated on FIG. 5*a*, 5*b* which will be described below.

FIG. 4*c* illustrates an alternative method of connecting the battery storage 7 to the DC link of the electric flow path 5. Here the connection is made through a DC/DC converter 19. Connection through a DC/DC converter is advantages in that the DC-link voltage can be kept more stable and controlled which is advantageous if an existing converter should be retrofitted with a battery storage 7 as described in the present document. It should be mentioned, that as an alternative, to the DC/DC converter, a changes in the control strategy of the converter which is retrofitted with the battery storage 7 can be made.

The design of the battery storage 7 and control hereof is not affected by the DC/DC converter i.e. design and control is as described above.

FIG. 5*a* illustrates an example of how the battery storage 7 can be integrated in the converter 6 of a wind turbine 1. As illustrated, the battery storage 7 is connected to the electric flow path 5 between the grid side converter 6*b* and the grid 4. The embodiment of FIG. 5*a* illustrates three columns (also referred to as strings) of series connected battery cells 8 together forming the battery storage 7. Each of the three columns is connected to one of three phases of the electric flow path 5. Accordingly, it is possible to regulate each of the three phases individually (at least with the phase displacement of 120 degrees). Further, in case of support from the battery storage 7 to an asymmetric or unbalanced grid, the control of the phases in the battery storage 7 will be different from each other.

One controller 12 for controlling all of the battery cells 8 may be used, however this is not the only possibility of controlling the battery storage 7. Each column/phase/string may be controlled by its own controller 12 and a master controller or battery storage controller 27 may then coordinate the control of the controllers 12 of the individual columns/phases/strings as illustrated. Further each of the battery cells 8 may be controlled by a controller (not illustrated) based on control signals from the controller 12.

Further, one current sensor 17 is illustrated for measuring the current (Imeas) in the current path 13 between the battery storage 7 and the electric flow path 5, however this is not the only possibility for measuring this current. Further, one voltage sensor 18 is illustrated for measuring the voltage (Vref) over the battery storage 7 (only one voltage sensor 18 is illustrated, however one for each column of the battery storage 7 is preferred), however this is not the only possibility for measuring this voltage.

As mentioned, the battery storage 7 can be integrated between the grid side converter 6b and the utility grid 4 i.e. at the AC part of the electric flow path 5. The implementation of the battery storage 7 as illustrated on FIG. 5a is advantageous especially because it is easier to implement (retrofitted) into an existing system. Further, this location can help decreasing the grid harmonics and by that lower filter requirements.

An electric diagram of a battery cell 8 preferred for use in a battery storage 7 connected to an AC part of the electric flow path is illustrated on FIG. Sb. As on the electric diagram illustrated on FIG. 4b, the diode of the semiconductor switch 10 is a body diode of a MOSFET. The battery cell 8 illustrated on FIG. Sb includes four semiconductor switches 10 because it has to comply with AC current and voltage i.e. both negative and positive polarity and still be able to bypass the battery cell 8 as described above. FIG. Sb only illustrate one battery element 9 in the battery cell 8, however as understood from the above description, there may be several battery elements 9 in a battery cell 8.

FIG. Sc schematically illustrates the battery cell 8 of FIG. Sb and the switches 10 implemented on a PCB 11. It is illustrated, that the PCB includes all four switches 10 together with gate drivers 20 controlling the switches 10. The galvanic isolation of the embodiment illustrated on FIG. Sc is implemented as part of the gate driver 20

From the above description it is now clear that the present invention discloses a battery storage 7 for use in an electric system such as the grid 4, in relation to wind turbines or the like. The battery storage 7 can be connected to a DC part or AC part of an electric system such as an electric current path 5 from the generator 3 to the utility grid 4 of a wind turbine. The voltage Vref over the battery storage 7 is controlled based on the difference between a reference current Iref (a desired current to flow in the current path 13 between the electric flow path 13 and the battery storage 7) and a measured current Imeas (measured in the current path 13 between the electric flow path 13 and the battery storage 7).

The battery storage 7 is charged if the reference voltage Vref is lower than the voltage of the electric flow path 5 where the battery storage 7 is connected hereto. The battery storage 7 is discharged if the reference voltage Vref is higher than the voltage of the electric flow path 5 where the battery storage 7 is connected hereto.

In addition to the above features of the present invention, the present invention facilitates bypassing defect battery cells to continue operation, monitor State Of Health (SOH) on each battery element 9 to plan battery exchange better and by that lower operational costs and active filtering that can lower requirement of grid filter components.

Accordingly, the present invention is advantages in that it facilitates energy 5 storage and power converter in one solution. It reduces CAPEX by highly automated production and modular design. It facilitates high flexibility and scalability in terms of power and energy rating. It reduces OPEX due to extended battery lifetime and ability to do predictive maintenance. It facilitates higher reliability from modular design which allow continued operation during failures.

By the integrated energy storage solution of the present invention, a cost-effective solution that combines energy storage and power conversion in one solution is obtained. This new storage solution will significantly lower CAPEX and OPEX, while remaining scalability and flexibility from a modularized design and solve limitations such as high acquisition and maintenance costs, which impedes extensive implementation in relation to conventional solutions.

It should be mentioned, that the battery storage 7, may also be used in relation to a solar system generating energy from one or more solar panels. In such embodiment, the battery storage 7 will be controlled as described above and preferably connected between the solar system and the grid connected hereto.

Finally it should be mentioned that the above features of the description and the figures of the this application can be combined in that they all relate to the same invention although described in different embodiments. Accordingly, elements illustrated on one figure may be existing on other figures even though not illustrated hereon.

Battery storage 7 also referred to as energy storage should in an embodiment be understood as a so-called uninterruptible power supply also referred to as an UPS. The battery storage when operated as an UPS can operate as what sometimes is referred to as an inline UPS and as an offline UPS. No matter if the battery storage 7 is operated as inline or offline UPS, it can be connected to a power system such as an electric grid either as part of or in relation to a wind turbine or as a stand alone device independent of the wind turbine, such UPS 22 is illustrated on FIG. 6a. If connected to the grid as a stand alone device it can be used for supporting grid voltage, frequency and power. Further, it can be used as buffer for energy storage to store energy to a point in time when it is needed or the price is better than when produced.

Used outside the wind turbine, the UPS 22 often requires an independent UPS controller 23. In the embodiment illustrated on FIG. 6a, the UPS controller 23 is receiving information from the grid 4 and from the a controller 12 of the battery storage 7. In embodiments, the UPS controller 23 also receives information from the load 24 which may by a power consumer or it may be another part of the grid 4. The information is used to control a first UPS switch 25 and a second UPS switch 26 the position of which is used to connect/disconnect the battery storage 7 to/from the connection between grid 4 and load 24.

The embodiment illustrate on FIG. 6a is advantage over classical inline UPS solutions. In classic inline UPS solutions, the AC voltage on the grid 4 has to be rectified to DC voltage to be stored in the UPS solutions and then an inverter is needed to subsequently generate AC voltage for the load/grid. Hence, the voltage needs to be processed by two converters, which leads to a low overall efficiency.

The battery storage 7 illustrated on FIG. 6*a*, is in this embodiment a DC storage comprising at least one string of battery cells 8, generating an AC voltage which is corresponding to relevant grid code requirements. The UPS switches 25, 26 are controlled by the UPS controller 23, which ensures that during normal operation, the power for the load 26 is taken from the grid 4.

When the grid 4 is not present (or faulty) i.e. when an operation is not normal, the power is delivered by the battery storage 7. By the construction of the UPS 22 illustrated on FIG. 6*a*, there is no need for fast grid fault detection means. This is because the UPS switches 25, 26 is constructed and controlled so that the power flow for the load is not disturbed. This is advantageous in that for the UPS illustrated on FIG. 6*a* can be used as energy storage, for smoothening power fluctuation on or pushed to the grid, as a DC UPS, etc.

FIG. 6*b* illustrates schematically how the UPS switches 25, 26 can be constructed. The UPS switches 25, 26 in this embodiment are bidirectional devices, i.e. two semiconductor switches 10, preferably IGBTs, where the input to the switch 25, 26 is connected to the collector leg of the first IGBT 10*a* and the output of the switch 25, 26 is connected to the collector leg of the second IGBT 10*b*. The emitter leg of both IGBTs are connected together and the gate leg of both IGBTs are connected to the UPS controller 23. FIG. 6*c* illustrates an example of voltages and currents 10 related to the UPS configuration illustrated on FIG. 6*a* with the switches 25, 26 illustrated on FIG. 6*b* during two grid faults. The grid faults occur at 0.42 and at 0.65 (and ends at 0.55 and 0.78 respectively) and as illustrated, these grid faults are barely noticeably on the "load voltage" and "load current" plots. This is due to the coupling in of the battery storage illustrated by the plot of the "battery storage current", a coupling which is carried out by the UPS controller. FIG. 7 illustrates a PCB 11 according to an embodiment of the invention. The PBC comprises the cascaded coupled H-bridge switches 10 the status of which determines if the current path 13 is passing through or bypassing the battery cell 8. As illustrated, an additional PCB bypass switch 28 is illustrated. This PCB bypass switch 28 is used in order to ensure that no matter what happens at the PCB, the current path 13 through the battery storage 7 is intact. Hence, in case of a failed PCB or components hereof the controller 12 (string controller or battery storage controller) is able to bypass the PCB 11 by closing the bypass switch 28. This is advantageous in that it has the effect that it makes the battery storage 7 fault tolerant in terms of PCB faults such as converter faults (gate driver, switch faults) and thereby eliminates a single point of failure that could occur due to converter faults.

The bypass switch 28 may be implemented on the PCB or as illustrated external to the PCB. Implementing the bypass switch 28 on the PCB is advantageous in that the switch system is easier to design and produce. Implementing the bypass switch 28 external to the PCB is advantageous in that it dose not have to be replaced if the PCB fails. Further, the implementation external to the PCB is advantageous in that the bypass function completely bypassing a battery cell 8 can be used if the battery cell 8 or PCB 11 is to be replaced.

Accordingly, FIG. 7 illustrates one battery cells 8 of a plurality of battery cells 8 of a battery storage 7, the current path 13 through the battery storage 7 is controlled by a semiconductor switch configuration 10 implemented between two terminals of the PCB 11, wherein the semiconductor switch configuration 10 comprises a controllable galvanic connection such as the bypass switch 28 between the two AC terminals facilitating bypassing the semiconductor switch configuration 10 in case of fault on the PCB. Here the semiconductor switch configuration is also referred to as switches 10 in a so-called cascaded H-bridge.

The bypass switch 28 is preferably controlled by the controller 12 or the battery storage controller 27.

An advantageous feature of the battery storage 7 of the present invention is that it can be charged with relatively low charging voltages due to the possibility to only include one battery cell 8 in the current path through the battery storage 7. To be able to control the current which flows into the battery storage, the sum of the battery cell voltages has to be higher than the absolute value of the charging voltage. So if the series connected battery elements of a battery cell reaches e.g. 50V and only one battery cell is to be charged, the voltage at the input/output of the H-bridge has to be between up to 50V AC (peak) or 50V DC. The charging voltage has to be below the battery voltage in order to be able to control the current flow by the MOSFET switches (when MOSFET switches are used), otherwise the anti-parallel diode will conduct and the charging current cannot be controlled by the MOSFET switch 10. This is especially advantageous in that in wind turbines or solar systems if only the voltage established is (according to the above example) below 50V the battery cell 8 can be charged. In this way when the rotor of the wind turbine rotates but the wind speed is below cut in, the energy generated can be used to charge the battery cells 8 of the battery storage 7 one by one. Similar if the sun is not shining much, the little energy generated from a solar panel energy production plant can be stored in the battery storage 7.

Hence the controller 12 is provided with information of the voltage in the electric current path 5 i.e. knowledge of available charging voltage is provided which is then used to control the number of active battery cells 8 of the current path 13 through the battery storage 7 and thereby the number and individual battery cells 8 to be charged.

The type of energy storage device (battery of different types (Li Ion, etc.), capacitor of different types (lithium capacitors, etc.), used for the battery storage 7 of the present invention, is preferably Li-ion batteries, but other types are also possible to used. The type is determined by the application in which the battery storage 7 is to be used. If e.g. the battery storages main purpose is to deliver high peak current for a short period of time, then a Li-ion type facilitating this may be used in the same way if the main purpose is to deliver lower current for a longer time, then a type of Li-ion batteries supporting this is chosen.

As is now clear from the above, the present invention describes a battery storage 7 which comprises a plurality of controllable battery cells 8. The battery cells are selectively controllable meaning that by means of switches 10 they can be active or inactive in establishing the total voltage over the battery storage 7. A voltage over the battery storage 7 can be established by a plurality of different combinations of the active battery cells 8. If one batter cell 8 is inactivated, another may be activated and if e.g. the state of charge of the first again becomes higher than the second, the battery storage voltage can continue to be established by activating the first while inactivating the second battery cell 8.

The activating and inactivating of the battery cells is controlled by switches 10 preferably located on a PCB 11. The switch configuration of the PCB 11 is preferably a cascaded H-bridge and the switches are preferably controlled by a controller 12. In case the battery storage 7 comprises more than one strings of serial connected battery cells 7 preferably one string controller is used for each of the strings. Preferably in such embodiment, the string controllers are communicating with a master battery storage controller. In this way in principle any desired voltage can be established from the battery storage in that higher voltage simply requires more battery cells in series and higher capacity simply requires ore battery cells in parallel. Further, it should be mentioned, that it may be possible to connect several strings in one large series of battery cells by switches.

The battery storage 7 can be connected directly (without e.g. DC/DC converters) to an electric system in many different locations internal or external e.g. to wind turbines. Internal on both sides of the converter or in the DC link hereof External to the wind turbine as part of a wind park as an energy storage and/or for grid support. In any event, the battery storage 7 can be used to start up or power during grid faults one or more wind turbine used as auxiliary power supply for yaw and pitch drive, etc.

In theory, there are no high voltage limit for the battery storage 7 and the main current limiter is the availability of the semiconductors switches 10. In a preferred embodiment of the invention the voltage is around +−1000 V and around 100 A rms.

Finally it should be mentioned, that even though the above description only as described battery cells 8, capacitors may also be used to replace or support the battery cells 8. With capacitors, the battery storage 7 is able to deliver or absorb high power for a short time which could be relevant in relation to grid support (if frequency/voltage drops the grid can be boosted by the battery storage 7, if frequency/voltage increases, the grid can absorb (by charging) power from the grid. Capacitors can be added as a separate string of a battery storage 7 as one or more battery cells 8 that is connected when relevant. The battery storage 7 is able to provide reactive power to grid support. With batteries, the battery storage 7 is able to deliver lower power for a long period of timer whereas with capacitors the battery storage 7 is able to deliver high power for a short period of time. Accordingly there are advantages in combination of capacitors and batteries in a battery module 7 of the present invention.

LIST

1. Wind turbine
2. Rotor
3. Generator
4. Utility grid
5. Electric current path (through the wind turbine from generator to utility grid)
6. Converter
   a. Generator side converter
   b. Grid side converter
7. Battery storage
8. Battery cell
9. Battery element
10. Semiconductor switch (10a, 10b, 10c and 10d used to distinguish switches of the same battery cell)
11. Printed circuit board
12. Controller
   a. Control module
   b. Modulator module
   c. Subtraction node
   d. Current reference generator
13. Current path (from the electric current path and through the battery storage)
14. Control signal path
15. Galvanic insolation
16. External controller
17. Current sensor
18. Voltage sensor
19. DC/DC converter
20. Gate drivers
21. Grid side filter
22. UPS
23. UPS controller
24. Load
25. First UPS switch
26. Second UPS switch
27. Battery storage controller
28. PCB bypass switch Iref. Reference current
Imeas Measured current
Ierror Difference between reference and measured current
V ref Reference voltage

The invention claimed is:

1. A wind turbine comprising:
   a rotor to generate an electric current in a generator,
   an electric flow path configured for conducting the electric current to an electric grid;
   a battery storage electrically connected to the electric flow path, the battery storage including a plurality of battery cells, each battery cell including at least one battery element and four semiconductor switches; and
   at least one controller configured to control a voltage over the battery storage by controlling a status of the respective four semiconductor switches of multiple respective battery cells of the plurality of the battery cells, whereby:
   a current path is controlled to bypass at least one respective battery element of one or more of the multiple respective battery cells, or
   the current path is controlled to pass through the at least one respective battery element of the one or more of the multiple respective battery cells,
   wherein the four semiconductor switches of the multiple respective battery cells are electrically connected to a first uninterruptible power supply switch and to a second uninterruptible power supply switch,
   wherein the current path is connected or disconnected from a load via the first uninterruptible power supply switch and the current path is connected or disconnected for a power supply with the second uninterruptible power supply switch,
   wherein the at least one respective battery element of the one or more of the multiple respective battery cells is configured to supply the load when connected thereto via the first uninterruptible power supply switch, and
   wherein the at least one respective battery element of the one or more of the multiple respective battery cells is configured to be charged from the power system, when connected thereto via the second uninterruptible power supply switch.

2. The wind turbine according to claim 1, wherein the four semiconductor switches of each of the plurality of battery cells, respectively, are mounted on a printed circuit board, respectively, wherein the respective printed circuit boards are part of a control signal path between the controller and the four semiconductor switches of each of the plurality of battery cells, and wherein the respective printed circuit boards are part of the current path through each of the plurality of battery cells.

3. The wind turbine according to claim 1, wherein the voltage over the battery storage is regulated based on a difference between a reference current (Iref) established by the at least one controller and a measured current (Imeas) provided to the at least one controller, and
wherein the measured current (Imeas) represents the electric current conducted in the current path between the current path and a first battery cell of a column of 5 series connected battery cells of the battery storage.

4. The wind turbine according to claim 1, wherein the plurality of battery cells of the battery storage are arranged as a plurality of columns of battery cells,
wherein the at least one controller includes a plurality of individual controllers,
wherein the respective four semiconductor switches of the respective battery cells of each column are controlled by the respective individual controllers, and
wherein the battery storage further includes a master controller configured to control of each of the individual controllers.

5. The wind turbine according to claim 1, wherein the plurality of battery cells of the battery storage are arranged as columns of series connected battery cells, where there is a column for each phase connected to the battery storage, and
wherein at least one battery cell in each respective column is connected to at least one battery cell in a respective neighboring column.

6. The wind turbine according to claim 1, further comprising a UPS controller,
wherein the UPS controller is configured for controlling the first UPS switch and the second UPS switch so as to provide AC voltage to a load in case of grid fault.

7. The wind turbine according to claim 1, wherein the AC voltage is generated by strings of battery cells of the plurality of battery cells,
wherein the at least one controller includes a plurality of individual controllers, and
wherein each of the strings of battery cells is controlled by a respective independent controller.

8. The wind turbine according to claim 1, wherein the at least one controller is configured for bypassing the respective four semiconductor switches controlling a respective battery cell by control of a PCB bypass switch.

9. The wind turbine according to claim 1, wherein the controller is configured for controlling the respective four semiconductor switches of each battery cell so as to allow only one battery cell to be charged at a time.

10. A method of controlling an electric flow path to and from a battery storage, the method comprising steps of:
conducting an electric current to an electric grid via the electric flow path;
electrically connecting the battery storage to the electric flow path, the battery storage including a plurality of battery cells, and each battery cell including a battery element and four semiconductor switches,
controlling a voltage over the battery storage by controlling a status of the respective four semiconductor switches of multiple respective battery cells of the plurality of the battery cells,
wherein the step of controlling the voltage over the battery storage includes controlling:
a current path to bypass at least one respective battery element of one or more of the multiple respective battery cells, or
the current path to pass through the at least one respective battery element of one or more of the multiple respective battery cells,
wherein the respective four semiconductor switches of the multiple respective battery cells are electrically connected to a first uninterruptible power supply switch and to a second uninterruptible power supply switch,
wherein the current path is connected or disconnected from a load via the first uninterruptible power supply switch and the current path is connected or disconnected for a power supply with the second uninterruptible power supply switch,
wherein the at least one respective battery element of the one or more of the multiple respective battery cells is configured to supply the load when connected thereto via the first uninterruptible power supply switch, and
wherein the at least one respective battery element of the one or more of the multiple respective battery cells is configured to be charged from the power system, when connected thereto via the second uninterruptible power supply switch.

11. The method according to claim 10, wherein the step of controlling the voltage over the battery storage further includes steps of:
establishing a current error (Ierror) between a current reference (Iref) of a desired current in the current path and a measured current (Imeas) in the current path,
establishing a voltage refence (Vref) based on the current error (Ierror), and
establishing the voltage over the battery storage by establishing a plurality of gate signals for controlling the status of the respective four semiconductor switches and thereby the current path through one or more battery elements.

12. An uninterruptible power supply comprising:
a battery storage system including:
a battery storage electrically connected to an electric flow path, the battery storage including a plurality of battery cells, each battery cell including at least one battery element and at least two semiconductor switches, and
a controller configured to control a voltage over the battery storage by controlling a status of the respective at least two semiconductor switches of multiple respective battery cells of the plurality of the battery cells, whereby:
a current path is controlled to bypass at least one respective battery element of one or more of the multiple respective battery cells, or
the current path is controlled to pass through the at least one respective battery element of the one or more of the multiple respective battery cells,
wherein the uninterruptible power supply further comprises a first uninterruptible power supply switch and a second uninterruptible power supply switch,
wherein the current path is connected or disconnected from a load via the first uninterruptible power supply switch and wherein the current path is connected or disconnected from a power supply via the second uninterruptible power supply switch, and
wherein the at least one respective battery element of the one or more of the multiple respective battery cells is configured to supply the load when connected thereto via the first uninterruptible power supply switch, and
wherein the at least one respective battery element of the one or more of the multiple respective battery cells is configured to be charged from the power system, when connected thereto via the second uninterruptible power supply switch.

13. The uninterruptible power supply according to claim 12, wherein the load is one or more wind turbines powered by the uninterruptible power supply during start up and/or during a grid fault.

14. The uninterruptible power supply according to claim 12, wherein the load is a yaw drive and/or a pitch drive of a wind turbine.

15. The uninterruptible power supply according to claim 12, wherein the battery cells of the battery storage are charged one by one.

16. The uninterruptible power supply according to claim 12, wherein the first uninterruptible power supply switch and the second uninterruptible power supply switch are controlled by an uninterruptible power supply controller.

17. The uninterruptible power supply according to claim 12, wherein the first and second uninterruptible power supply switches are bidirectional switches.

18. The uninterruptible power supply according to claim 12, wherein the first and second uninterruptible power supply switches are controlled so as to connect/disconnect the battery storage to/from the connection between the power supply and the load.

19. The uninterruptible power supply according to claim 12, wherein the uninterruptible power supply is an inline uninterruptible power supply or an offline uninterruptible power supply.

20. The uninterruptible power supply according to claim 12, wherein the voltage of the battery storage is controlled by the battery cells, the battery cells comprise four semiconductor switches allowing the battery storage to comply with voltage of the electric flow path.

21. The uninterruptible power supply according to claim 20, wherein the electric flow path is an electric flow path of a wind turbine.

22. The uninterruptible power supply according to claim 12, wherein current flow from the battery storage is controlled so that the battery storage is discharged by power consuming activity of the wind turbine.

23. The uninterruptible power supply according to claim 12, wherein the battery storage is connected anywhere between a generator of a wind turbine and a load where the generated energy is used.

24. The uninterruptible power supply according to claim 12, wherein the battery storage is connected to an electric system internal in a wind turbine, wherein the battery storage is used as auxiliary power supply.

25. The method according to claim 14, wherein the step of establishing the voltage refence (Vref) is based, at least in part, on a state of charge of the battery elements.

* * * * *